United States Patent [19]

Dart et al.

[11] Patent Number: 5,328,190
[45] Date of Patent: Jul. 12, 1994

[54] METHOD AND APPARATUS ENABLING ARCHERY PRACTICE

[75] Inventors: Peter J. Dart, Boulder, Colo.; Howard F. Hall, Albuquerque, N. Mex.

[73] Assignee: Dart International, Inc., Englewood, Colo.

[21] Appl. No.: 926,539

[22] Filed: Aug. 4, 1992

[51] Int. Cl.$^5$ .......................... F41J 9/14; F41J 5/14; A63B 71/00
[52] U.S. Cl. .................................. 273/358; 273/371; 273/416; 273/419; 273/454
[58] Field of Search ............... 273/313, 314, 315, 316, 273/358, 359, 371, 373, 408, 416, 419, 440, 454, 460

[56] References Cited

U.S. PATENT DOCUMENTS

| | | | |
|---|---|---|---|
| 3,341,204 | 9/1967 | McDannold | 273/373 |
| 3,398,958 | 8/1968 | Sanzare | 273/373 |
| 3,590,225 | 6/1971 | Murphy et al. | 250/222 |
| 3,619,630 | 11/1971 | McLeod et al. | 250/222 |
| 3,623,065 | 11/1971 | Rockwood et al. | 340/323 R |
| 3,727,069 | 4/1973 | Crittenden, Jr. et al. | 273/371 |
| 3,807,858 | 4/1974 | Finch | 250/222 |
| 3,849,910 | 11/1974 | Greenly | 273/358 |
| 4,222,564 | 9/1980 | Allen et al. | 273/369 |
| 4,678,194 | 7/1987 | Bowyer et al. | 273/373 |
| 4,763,903 | 8/1988 | Goodwin et al. | 273/371 |
| 4,788,441 | 11/1988 | Laskowski | 280/561 |
| 4,948,371 | 8/1990 | Hall | 434/21 |
| 4,949,972 | 8/1990 | Goodwin et al. | 273/371 |
| 5,020,806 | 6/1991 | Martin | 273/371 |

FOREIGN PATENT DOCUMENTS 2156054 10/1985 United Kingdom ............... 273/358

Primary Examiner—Jessica J. Harrison
Attorney, Agent, or Firm—Francis A. Sirr; Earl C. Hancock

[57] ABSTRACT

An archery practice device simulates dynamic targets, such as in an animal hunt, on a visible screen. A video disk contains a plurality of hunting scenes which are projected via a video projector on a vertical screen whose size simulates an area normally viewed by an archer during a hunt. The screen images are comprised of pixel areas arranged in horizontal rows and vertical columns. A source of light of a spectrum outside the humanly visible range is provided adjacent the screen. Arrows penetrating this light field reflect light to a detector sensitive to light of said spectrum, but not sensitive to visible light otherwise. The detector generates a full screen signal of a plurality of pixel areas, certain of which contain indicia of light reflection from the arrow. Upon detecting such reflection, the scene frame is frozen on the screen. The frozen frame is coordinated to the signal from the light detector, whereupon a hit zone image is projected to indicate an arrow impact point relative to the frame image to show the scoring of the point of arrow impact.

25 Claims, 5 Drawing Sheets

METHOD AND APPARATUS ENABLING ARCHERY PRACTICE

BACKGROUND OF THE INVENTION

1. Field of the Invention

This invention relates to the field of target shooting, and more specifically to an archery range practice device that simulates dynamic target situations. This invention is particularly well suited for simulating an animal hunt for an archer by providing a plurality of hunting scenes containing moving animals and sounds simulating the animals in their natural environment. This invention is especially useful as a training tool to enhance the shot placement and shot selection skills of an archer.

2. Description of the Prior Art

Various devices are provided in the art to enable target shooting practice, including the detection and indication of the spot within a target area through which a projectile has passed.

In U.S. Pat. Nos. 4,763,903 and 4,949,972, both by Goodwin et al, a printed paper target sheet is supported in front of an X-Y array of light beam generators and corresponding light beam detectors. When a projectile is fired at the target, the projectile breaks at least two light beams. The X-Y locations at which the light beams are broken enable a computer to score the projectile hit relative to the target. The computer can allocate scores to a particular individual, total the scores, and provide a CRT display thereof. The display can also show the target and its hit areas.

U.S. Pat. No. 5,020,806 by Martin teaches a dart game having two horizontally-spaced targets of conventional configuration. Dart hits on the targets are detected. A shared computer scores the hits on the targets, and provides a display of the results.

U.S. Pat. No. 3,619,630 by McLeod et al describes an automated archery range having a quiver whose position defines a firing line. A fixed, penetrable target is spaced from the quiver and carries a painted or projected target that can be changed as desired. A fired arrow penetrates the target, hits a backstop located behind the target, and is then automatically returned to the quiver. An image at the quiver simulates the target. An optical scanning system, including a rotating mirror, senses passage of the arrow, and an indicator light is controlled thereby to indicate the arrow hit position relative to the target.

U.S. Pat. No. 3,590,225 by Murphy is generally similar, and teaches a counter and a computer for determining the hit position of an arrow in the target area.

U.S. Pat. No. 4,678,194 by Bowyer et al describes a dart/archery target that signals the hit position by virtue of the dart/arrow acting as a transmitting antenna that radiates energy to a sensor.

U.S. Pat. No. 4,222,564 by Allen et al describes a target system having fixed and moving targets, and a control and score keeping system. A motion sensor detects vibration of a target when the target is hit.

U.S. Pat. No. 3,727,069 by Crittenden et al describes a target system wherein the position of a projectile hit is determined by the interruption of a plurality of light sources that are positioned along the X and Y axes of a target area.

U.S. Pat. No. 3,623,065 by Rockwood et al describes an archery range having a self-healing screen, and a projector for projecting a number of different but fixed target markings on the screen. Two mirrors and two scanning light sources are located in front of the screen. Interruption of the two scanning beams by an arrow enables detection of the arrow hit position on the screen. A monitor adjacent to the shooter replicates the target and shows the location of the arrow hit thereon. An automated arrow recovery system is likewise shown.

U.S. Pat. No. 3,807,858 by Finch describes a device for indicating the passing of a projectile through an area. In this device, the reflection of overlapping scanning light beams off of the projectile is detected. Signals are thus developed to enable a display to provide similar overlapping light beams whose intersection visibly indicates the point at which the projectile passed through the area.

U.S. Pat. No. 4,948,371 by Hall describes an interactive video system for use in training a security trainee. This patent is incorporated herein by reference for the purpose of illustrating the state of the art of interactive video training systems. However, this patent does not relate to an archery system, and does not freeze the hit frame and then display the frozen frame with the animal kill zones and the arrow hit indicators.

In the system of the Hall patent, a video disk is used to project a full size moving scenario onto a screen. The scenario is capable of branching to one of a number of sub scenarios, depending upon the results of the training session. The trainee is provided with an IR emitting laser gun. When the trainee shoots at an adversary that appears in a frame of the scenario, IR energy from the gun is reflected from the hit point on the screen to a full screen IR camera located adjacent to the scenario projector.

Hall employs a computer to analyze the output of the IR camera, and determines if the adversary was hit, and the placement of the hit on the person of the adversary. Placement of the hit is determined by means of hit zone information stored in the computer for this particular frame. This computer memory includes the placement of both kill and disable zones within the person of the adversary. In accordance with the detected placement of the hit, the scenario branches to various sub scenarios, including the ability of the adversary to shoot back by way of energization of an IR emitting LED that faces the trainee. It is assumed that the adversary is always a perfect shot, and unless the trainee has sought cover, as is sensed by actuation of a treadle switch, an IR sensor on the vest worn by the trainee indicates a hit by the adversary.

While the prior art is generally useful for its intended purpose, the need remains in the art for a system and process suitable for training an archer in a controlled environment, but with simulation of the natural environment an archer might encounter, as in game hunting. Furthermore, the contemporary training of an archer for hunting is predominantly on static targets and actual field experience. Unfortunately the latter results in frequent debilitating but non-critical injury of the game animals. Thus, a need remains for a controlled and safe environment in which to realistically train archers for hunting so as to improve the quality of their abilities as game hunters and most notably the quality of their skills in shot placement and shot selection.

SUMMARY OF THE INVENTION

The present invention is an archery practice device and process that simulates dynamic target situations, such as an animal hunt, by providing a video disk having stored thereon a plurality of hunting scenes containing moving animals and audio simulating a natural environment. These scenes are projected on a screen of a size appropriate to simulate an area normally viewed by an archer during an animal hunt, and wherein an unbroken field of light of a spectrum that is invisible to an archer is provided adjacent to the screen. As an arrow penetrates the light field, light is reflected from the arrow to a detector sensitive only to light of this invisible spectrum and capable of monitoring the entire screen.

The hit frame is frozen on the screen upon impact of the arrow in response to the signal from the light detector. The point of arrow impact is indicated relative to the frozen frame. The kill zones are projected on the frozen frame to present an indication of the arrow hit relative to the kill zones for the displayed scene or animal.

The present invention provides an archery practice range that simulates an animal hunt by providing a video disk containing a plurality of hunting scenes of moving animals in a native environment. These scenes are projected in frame sequence on a screen whose size simulates an area normally viewed by an archer during an animal hunt.

An arrow shooting range is provided in the shape of a closed end tunnel having a rectangular or square cross section. The closed end of the tunnel contains a vertical screen on which a moving image is projected by way of a floor mounted video projector.

A continuous vertical plane of light not visible to humans, such as infrared (IR) light, is located a short distance ahead of the screen. The arrows used for shooting at the image can have a blunt leading end, and carry an IR reflector on or near the leading edge thereof. As an arrow penetrates the IR layer, it reflects an IR pulse to a full frame IR camera positioned to receive the IR light.

The output of this detector comprises a full screen image having a dark image output only in an area that is coincident with the reflection from the arrow.

In order to eliminate the shadow of an arrow in the IR camera view, the arrow drops vertically down to the floor after impact with the screen. A software controlled computer system is constructed to respond to only the first IR reflection. Thus, secondary reflections from a falling arrow are ignored.

The portion of the tunnel between the screen and the projector preferably comprises an opaque wall covering. The shooting area comprises the length of the tunnel from the projector to the open end of the tunnel. The tunnel walls in this shooting area allow a diffused light to enter the tunnel.

Preferably, the outside surface of the tunnel is covered with archery netting to prevent penetration by arrows that are shot outside of, but adjacent to, the tunnel.

This invention advantageously employs conventional interactive video disk system principles. An analog video/audio disk provides full screen, moving images such as of one or more game animals in their natural hunting environment. The audio makes it possible to enhance the visual images with the sounds of the animals as one would expect to hear in nature.

The scenes include circumstances, such as a deer walking through the woods, wherein in some frames of the image the hunter is not presented with a view of the animal wherein there is an appropriate shot opportunity.

For example, a scenario or sequence of scenarios are randomly selected from the disk, each sequence comprising a few seconds of a hunting scene. If an arrow is dispatched during a sequence, the IR light field is penetrated, and the IR reflection of the arrow operates to signal the computer to freeze that frame of video, for example, for 10 seconds. An IR detecting camera sends its full screen signal to the computer. The computer correlates this detected IR screen on the frozen hunting frame. As a result, the point of arrow impact is displayed.

In addition, each frame that that has an animal kill zone is provided with an overlay that shows the location of the kill zones on the frozen frame. The correspondence between the variable position hit spots and the fixed position kill zones provides both a manual and a computer means for scoring the arrow hit. For example, if no arrow is dispatched during a scene, a zero is scored, and if an arrow is dispatched when there is no shot opportunity, a negative number is scored.

Typically the computer is set up so that the sensing of an arrow hit results in ending the particular frame sequence at whatever frame the arrow hit was detected, and the program resumes, after a short delay, beginning with the next randomly selected sequence of frames although it is possible to resume the interrupted sequence.

Text is displayable on the screen, for example, to identify the name of the next shooter, and to alert the shooter that a program of hunting scenes is about to begin.

For each possible sequence of frames, such as one of a series of hunting scenarios resident on one disk, the start and stop frame numbers are stored in memory, and are accessed randomly and played start to finish when an arrow hit is not sensed during the scenario. A disk might contain fifty-five such scenarios, by way of example.

Management software that is transparent to the shooter enables a central computer to access each site computer in order to obtain data for the purposes of billing and general record keeping.

Different sites may compete with each other off line. In this arrangement, the central computer accesses the computers at the competing sites, compares the results of the two teams, and reports the results back to the sites.

An object of the invention is to provide a dynamic target simulation system for archery practice and particularly to provide a moving image of an animal on a screen, wherein an arrow hit on the screen is detected, such that a frozen frame of the animal is then shown having animal kill zones overlayed thereon, such that the shooter may compare the arrow hit to the kill zones in order to determine a score.

As a further feature of the invention, the system is disabled so as to not respond to secondary reflections that may occur during a vertical drop of the arrow.

As another feature of the invention, audio signals are provided for the hunting scenes to simulate the natural environment of the hunting scene.

As yet another feature of the invention, the frozen image includes animal kill zones corresponding to the critical areas of one or more animals therein that are exposed to impact by an arrow, and these kill zones are shown or displayed along with the frozen hunting scene, so as to indicate the relationship between the kill zone and the point of arrow impact.

A further object of the invention is to provide a method and apparatus for simulating an archery animal hunt by way of a video disk that contains a plurality of hunting scenes containing animals, which scenes are projected onto a vertical screen whose size simulates an area normally viewed during an animal hunt, the screen comprising a array of pixel areas arranged in horizontal rows and vertical columns.

A continuous full screen field of light of a spectrum that is not visible to an archer (for example, infrared or IR) is located in proximity to the screen, and an arrow that is capable of reflecting light of the aforesaid spectrum provides reflection to a full screen detector that is sensitive only to light of the invisible spectrum. Upon detection of an arrow hit, the hunting scene is frozen on the screen with an arrow hit graphic overlaid onto the image, to thereby indicate a point of impact of the arrow.

Those having normal skill in the art will recognize the foregoing and other objects, features, advantages and applications of the present invention from the following more detailed description of the preferred embodiments as illustrated in the accompanying drawings.

DETAILED DESCRIPTION OF THE PREFERRED EMBODIMENT

Figure 1:
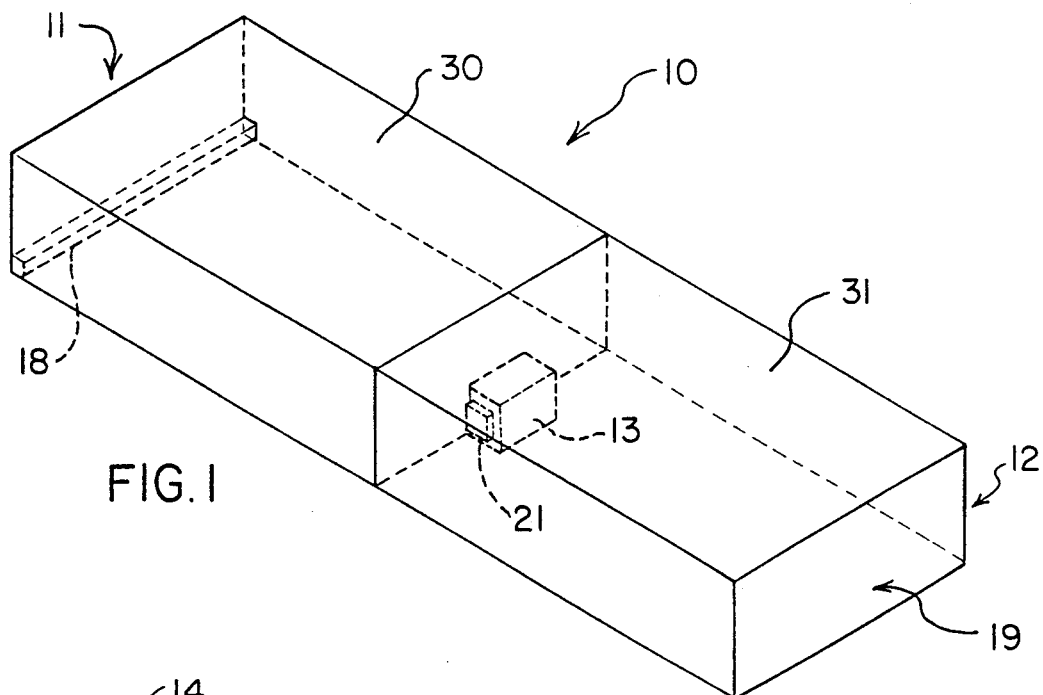
FIG. 1 is a perspective view of an archery range in accordance with the present invention.

FIG. 1 is a perspective view of an arrow shooting range constructed in accordance with the present invention. The components of the range are shown in FIG. 1 in their general overall operating relationship although somewhat out of proportion. This range is in the shape of a tunnel 10 having a target, or closed end 11, and an entry or open end 12. It has a generally rectangular cross section typically about ten feet high by twelve feet wide, and is about sixty feet long.

Figure 8:
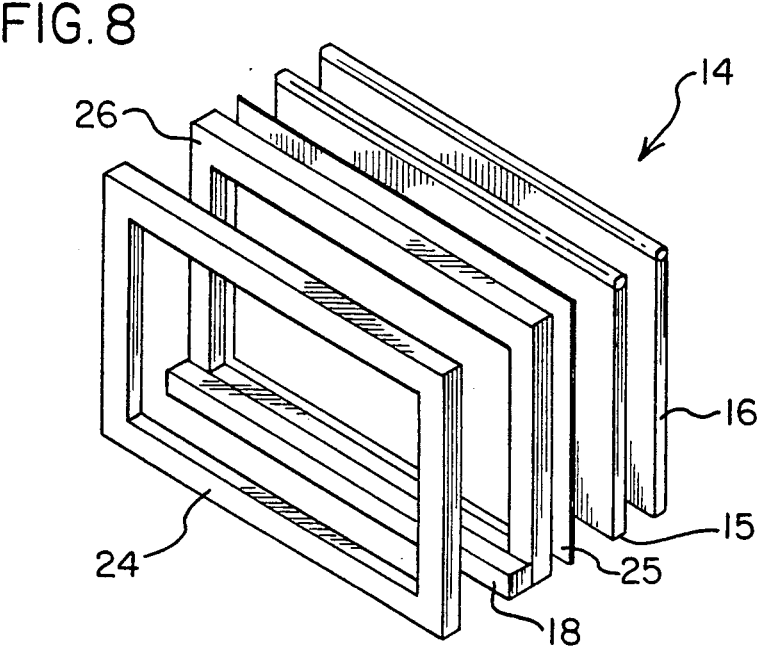
FIG. 8 is a partially exploded perspective view showing the general relationship of the elements associated with the video screen.

At the closed end 11 of tunnel 10 is a three layer vertical screen 14. A portion of screen 14 is shown in a side, broken view in FIG. 2 and a partially exploded perspective view is shown in FIG. 8. A moving hunting image is projected onto screen 14 by way of a floor mounted video projector 13 of conventional construction, for example, of a liquid crystal type.

Figure 2:
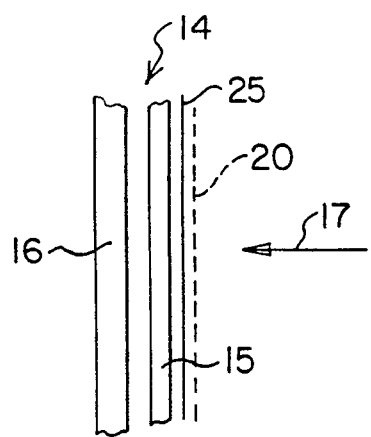
FIG. 2 is a partial side view of the elements associated with the screen at the closed end of the FIG. 1 tunnel.

With reference to FIGS. 2 and 8, screen 14 comprises a vertical screen 25 of an open mesh and overlaying a sheet of white felt fabric 15 suitable to reflect the projected image. Sheet 15, and mesh screen 25, cooperate for presenting a clear image to the shooter from a distance. Fabric 15 is, in turn, backed by a vertical sheet of carpeting 16 that is spaced a short distance therefrom. Carpet 16 provides the desired final arrow stopping or arresting characteristics. The flight of an arrow 17 nearing the end of its trajectory towards screen assembly 14 is likewise represented in FIG. 2. While not critical to the invention, an embodiment of screen 14 was a rectangle measuring about eight feet high and ten feet wide.

The closed end 11 of tunnel 10 includes a floor mounted housing 18 that contains one or more sources of infrared (IR) radiation that is directed upward from the flat, planar, floor 19 of tunnel 10. For example, IR source 18 may comprise a row of light emitting diodes or LEDs. As a result of the operation of the IR source 18 within tunnel 10, a continuous vertical plane 20 (see FIG. 2) of IR radiation or light (i.e., radiation that is invisible to a human) is located a short distance ahead of screens 15, 16 and 25, for example, about 0.5 inches ahead of fabric Haverol screen 25.

FIG. 8 illustrates in a slightly exploded view the interrelationships of the elements of screen 14 with regard to the IR source 18 and associated light shields. An outer frame 24 forms a barrier to prevent stray IR light rays from around the perimeter of screen 14 from causing false or disrupting signals at the IR detector 21. It might take the form of a black frame eight inches by one inch in cross-section, eleven feet wide and slightly less than nine feet in height. A similar bezel or frame 26 is positioned immediately in front of mesh screen 25 with IR source box 18 secured at its base. Frames 24 and 26 are held in position relative to one another by spacers (not shown) thereby forming a box intended to control the IR light emitted from source 18 so that a wall of IR light is emitted at the base of screen 14.

Polyester mesh screen 25 is preferably held in place under tension by spring attachments (not shown) around its entire perimeter somewhat like a trampoline. Felt 15 and carpet 16 are allowed to hang downwardly from horizontal rods at their tops so that they are free to pivot. The mesh of screen 25 is tight enough so that an arrowhead similar to FIGS. 3 and 7 will not pass through it. The tension on screen 25 allows it to flex towards hanging felt 15 and carpet 16 which absorb most of the energy of the impact of arrow 17. The tension on screen 25 is adequate to return the arrow to the area in front of the screen 14. The screen 25 tension likewise prevents dimpling or bending the screen 14 elements.

It is possible to obtain the function of frame 24 by a valence or other structure. Frame 24 helps contain the IR light from source 18 and frames the visible area for screen 14 with respect to the detector camera 21. Preferably the wall of IR light from source 18 is as close as the flatness of the face of screen 14 will allow.

Figure 9:
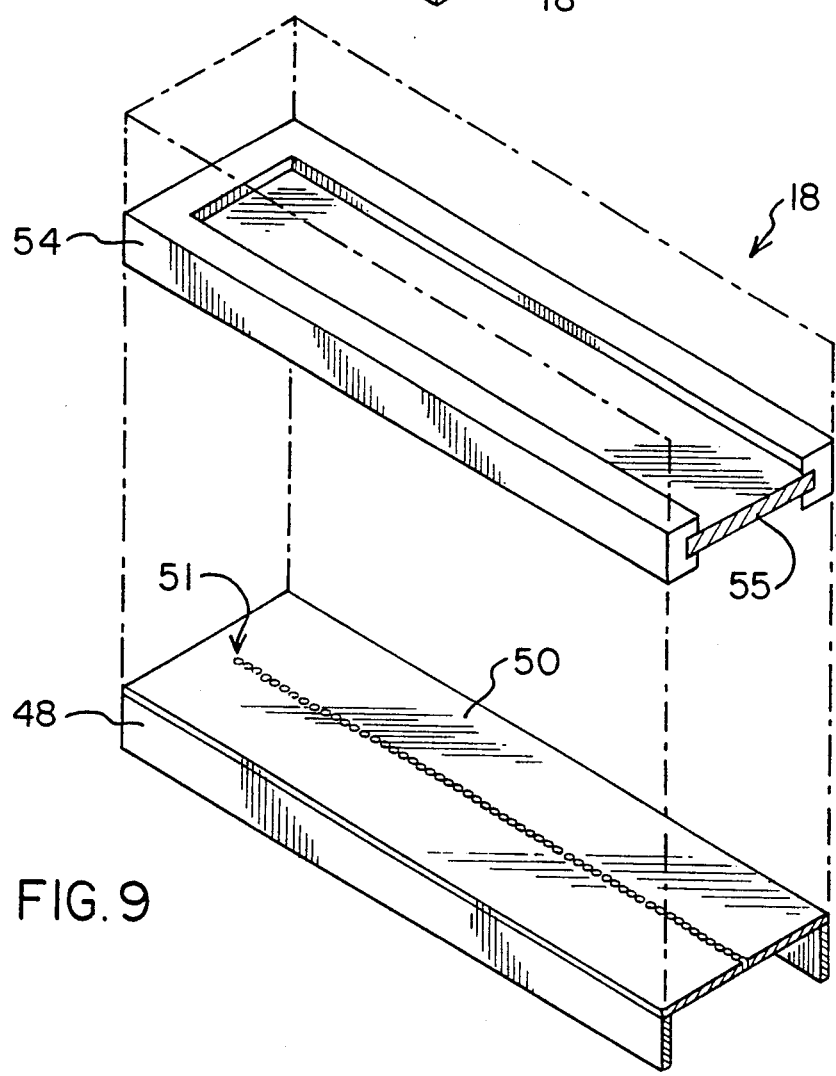
FIG. 9 is a partially sectioned view of the components in the box which produces a wall of light for reflection from an arrow upon impact on the screen.

A portion of IR light source 18 is shown in a perspective and sectioned view in FIG. 9. A housing 48 which is shown solid at the bottom also encloses the ends and sides as indicated by the dotted lines. Housing 48 is open at the top. A circuit board 50 is retained in the lower region of housing 48 and has an array of LEDs oriented to direct IR light upwardly. In one version of source 18 the LEDs were slightly less than 0.5 inches in diameter and were mounted on half inch centers. Thus, for a ten foot length, about two hundred forty LEDs were used.

Housing 48 has a bracket 54 secured thereto in the upper portion thereof. Bracket 54 holds one or more lens elements 55 in place which intercept the light from LEDs 51 and collimate it into an upwardly directed wall. Such lenses are conventional and redirect rays of light from a point source so that they all are commonly directed into parallel relationship and in the same direction.

For example, off the shelf, commercially available collimating lenses approximately three inches wide by four inches long and one fourth inch thick were placed in abutting relation within bracket 54 to form the ten foot long wall of IR light. Although not shown in FIG. 9, housing 48 also contains a power source and voltage regulator along with an on/off switch. One satisfactory implementation of the device was formed with housing 48 eight inches high by four and a half inches wide by one hundred twenty six inches long.

A horizontally traveling arrow, such as 17, depicted in FIG. 2, carries an IR reflector on the blunt leading end or edge thereof. As arrow 17 penetrates IR light wall 20, an IR pulse is reflected back to a full screen IR camera or detector 21 that is located for monitoring the complete front face of screen 14. In the example shown, detector 21 is positioned next to or directly beneath the projector 13, about nineteen feet from screen 14. The output of detector 21 is coupled to computer 33 and comprises signals corresponding to a full screen image present on screen 25, this image having a no-signal output surrounding the relatively small area that comprises the reflection signal from arrow 17 as the arrow passes through IR field 20.

By way of example, projector 13 comprised the brand Sharp XG2000 LCD projector, and provided a full screen image of 8×10 foot screen 14, comprising an X-Y (horizontal-vertical) coordinate signal containing 512 by 480 pixels. A VGA type display might employ an image definition of 640 by 512 pixels.

As is explained below, after it is detected that arrow 17 has impacted screens 15 and 25 and carpet layer 16, the computer system of the invention is constructed and arranged to respond to only the first IR reflection from arrow 17. Thus, secondary IR reflections from a falling arrow are ignored.

The portion 30 of tunnel 10, between closed end 11 and screen 15 and projector 13, preferably comprises an opaque wall covering. The tunnel shooting area 31 generally comprises the length of tunnel 10 that extends from projector 13 to the tunnel open end 19. The tunnel walls in shooting area 31 are preferably constructed and arranged to allow a diffused light to enter tunnel 10 in this portion thereof.

Usually tunnel 10 is located in an archery shooting area wherein conventional arrows are shot at stationary targets. As a result, the outside of tunnel 10 is preferably covered with (or defined by) archery netting (not shown), to thereby prevent penetration by arrows that are shot outside of, but adjacent to, tunnel 10.

Figure 3:
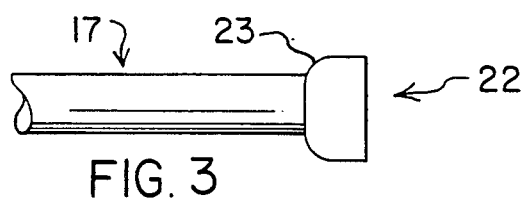
FIG. 3 is the side view of the leading end portion of an arrow of the type used in the practice of the invention.

FIG. 3 is the side view of the leading end portion 22 of an arrow 17 of a type found convenient for use in the practice of the invention. Arrow 17 has a blunt leading end 22 and a radiation or IR reflector 23 which can take the form of a chrome plated collar in proximity to the leading edge of arrow 17.

Figure 7:
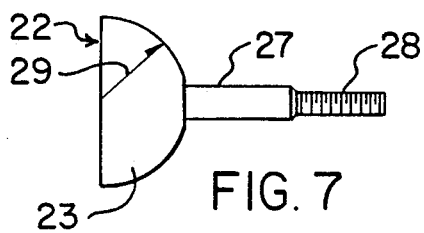
FIG. 7 is a side view of an adapter to provide the reflective tip removably attachable to the end of an arrow shaft.

A typical tip 22, suitable for attachment to the end of the shank of an arrow, is presented in FIG. 7. The outer end has a shank extension 27 terminating in a threaded portion 28 which mates with internal threads of a bore into the end of arrow 17. This allows replacement of a more conventional arrowhead with the target system head 22. While a variety of different sized heads 22 have proven satisfactory, a typical size for head 22 is to employ a radius 29 of 9/32 inches with a depth of 0.220 inches from front face to a 0.340 inch diameter face at the shank end of the bowl of reflector 23, a shank 27 with 0.365 inch length and 0.2035 inch diameter, and a threaded end 28 of 0.344 inches in length and a thread of 8-32 UNC class 2A.

Note that at least two modes of delivery of scenarios are possible. In the competitive mode, the system randomly selects scenarios and plays them in sets of six for up to four archers. In this mode, the computer scores each archer and links that score to a data file. One competitive round might consist of thirty shots for each archer divided into five sets. Scores are totaled and displayed on the screen after each set and a cumulative score is displayed at the end of the round.

The second mode is the random mode. This mode is simply a random selection of scenarios for presentation and does not have a function to keep track of who is shooting. The scoring is manual. Each scenario will, when shot at, display the usual hit mark and vital zones as well as the point score on the screen. This mode is useful in commercial archery ranges using systems in accordance with this invention, wherein the archer rents the range for a predetermined period of time during which the archer can take as many shots as desired.

The archery range simulator of the present invention comprises a computer controlled system for emulating real life bow hunting and/or league competition among teams of archers or bow hunters. While not critical to the invention, it is contemplated that a central computer will serve a number of individual sites where individual simulators of the invention are installed. This central computer will provide features, such as a master data base, that facilitates management of the sites, the distribution of information to and among the sites, and the recording and reporting of league competition results to the various sites.

At each of the sites, and under local computer control, real life scenarios are projected on an 8×10 foot screen, thus involving the archer in the reality of a real life bow hunting experience. While not critical to the invention, a plurality of multiple frame video scenarios are provided, for example, fifty-eight different scenarios per disc side. For each individual shooter, six of these scenarios are selected by the site computer at random.

In an embodiment of the invention, the system allowed from one to four shooters to shoot in sequence, each shooter being presented with a set of five multi-frame scenarios, each scenario typically running about 0.2 minutes. Each shooter will shoot six arrows in each set, for a total of thirty arrows for a complete round. To facilitate scoring by the site computer, the name of the shooter is displayed on the screen for a short time prior to the beginning of the sequence of scenarios for that shooter.

After all shooters have viewed and shot their computer generated scenarios, a brief interval is allowed for the shooters to approach the screen and retrieve the arrows. Of course, the facility could include an automatic arrow retrieval system with a conveyor to return the arrows to the shooters, if desired. During the arrow recovery time, the computer can display public service announcements, instructions, entertainment, and/or advertisements on the screen 14.

Figure 4:
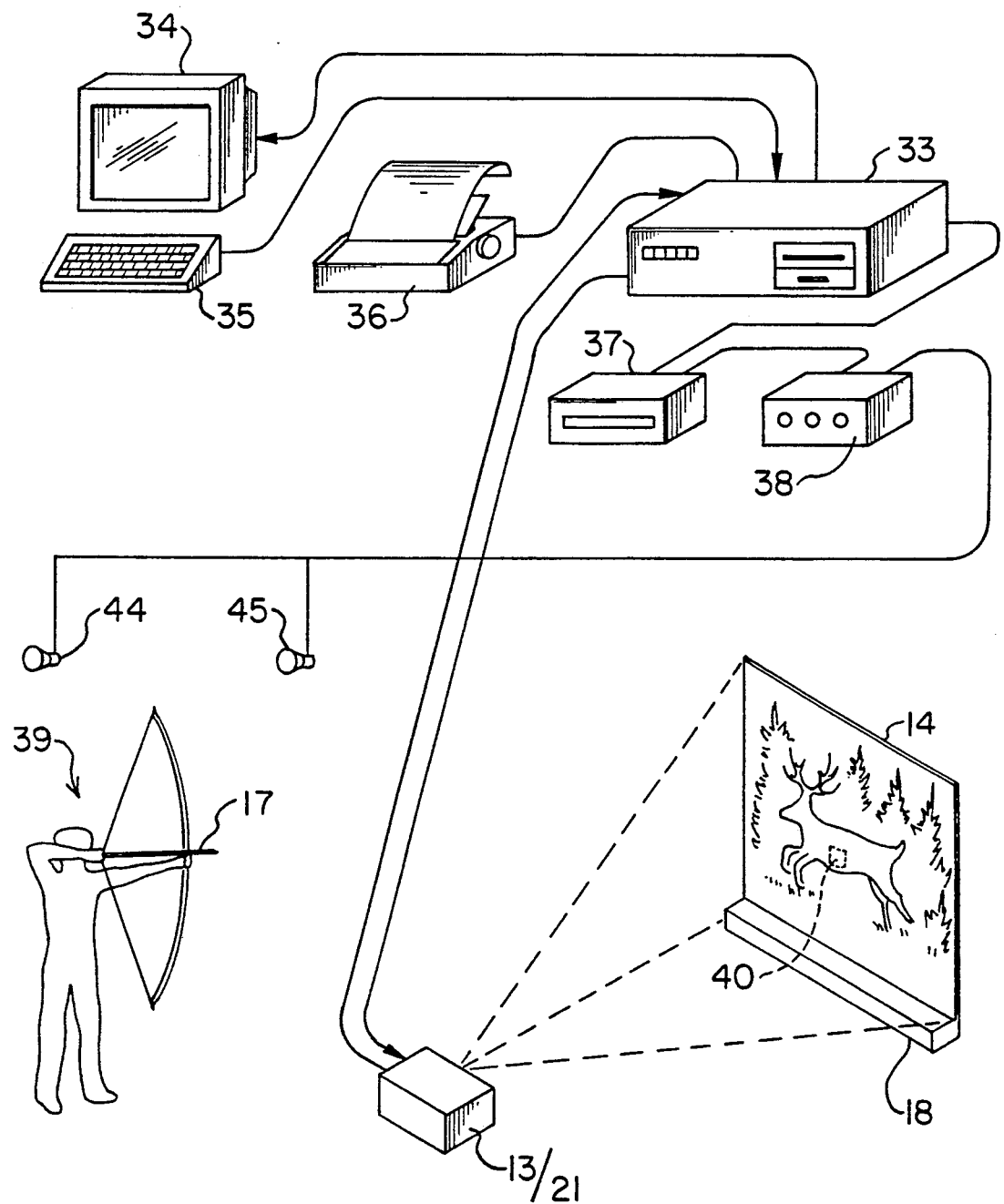
FIG. 4 is a diagrammatic showing of a shooting site incorporating the invention.

FIG. 4 is a diagrammatic showing of a shooting site incorporating the invention. The site computer comprises a central processing unit (CPU) box 33 having an analog video/audio disk player 37, a CRT display 34, a keyboard 35 and a printer 36, all of conventional and well known design. The video output of disk player 37 is provided to computer 33 which introduces it to projector 13. The audio portion is coupled from disk player 37 to the audio controller 38 and thence to speakers 44 and 45. As a result, a dynamic hunting scene is projected onto screen 14 at about thirty frames per second with appropriate sound accompaniment.

An archer 39, views this scene on screen 14, and determines the proper time at which to shoot an arrow 17 at the dynamically presented target displayed thereon, such as an animal or animals. As was mentioned above, the scene might include multiple frame portions during which archer 39 is not provided with a clear shot at a kill zone of the animal. Should the archer choose to shoot during such a frame portion, the CPU scoring system might actually penalize the archer by scoring negative points. This is accomplished by the computer storing information identifying the frames during which the archer does not have a clear shot at the target.

When arrow 17 is shot, the arrow penetrates the IR field that is generated by IR source 18 immediately in front of screen 14. As a result, an IR pulse is reflected back to an IR detector at the same station as camera 21. The camera 21 detector now sends a full frame signal to CPU 33, whereupon the shot-at frame is frozen on screen 14. While not present until the presence of an arrow 17 is detected at screen 14, the actual hit location as well as the animal kill zones (such as kill zone 40 shown in FIG. 4) are thereafter presented by computer 33 concurrently with, and as part of, the frozen frame. The kill zone organization is shown and described in greater detail in FIG. 5.

Figure 5:
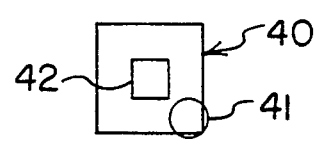
FIG. 5 shows an exemplary overlay added, as by a computer system, to the animal image so as to depict typical areas of animal kill or disabling in coordination with an arrow hit presentation on the display of a cathode ray tube (CRT).

The hit frame is frozen for a predetermined period of time such as a period of about ten seconds, for example. Thereafter the hit scenario is aborted, and the next scenario begins. The actual point of arrow impact in the FIG. 5 illustration is presented as a solid circle 41 which is exaggerated as compared to the actual arrow diameter for visibility at a distance. The center of circle 41 depicts the actual arrow impact point. Of course the computer 33 could present a bright outer circle and a central dot large enough for the archer to see from the shooting line.

The output of IR detector camera 21 usually comprises a multiple pixel area constituting the IR reflection from the arrow. CPU 33 also operates to identify and display this arrow hit area displayed on screen 14, for example, as shown at 41 in FIG. 5.

Thus, FIG. 5 shows the display of an example of a primary kill zone 42, and a secondary kill zone 40 surrounding the outer edge of zone 42 thereby coordinating display of a three zone arrow hit indicator. This zone pattern is visible on the target animal of the screen along the lines of zone 40 shown in FIG. 4. In the FIG. 5 example, the shooter 39 receives a score of "5" since the center of arrow indicator 41 is within the outer zone 40.

While the position of kill zone 40 is fixed with respect to the hit frame, the position of arrow hit zone 41 relative to zone 40 varies in accordance with the accuracy of shooter 39. The arrow hit zone 41 is really Just a spot and not a zone. The spot 41 is made larger than the actual tip of the blunt arrow only to facilitate visibility to the archer. The sensor, together with the computer, determines the exact point of impact and scores the hit in accordance with the actual impact point.

Figure 6A:
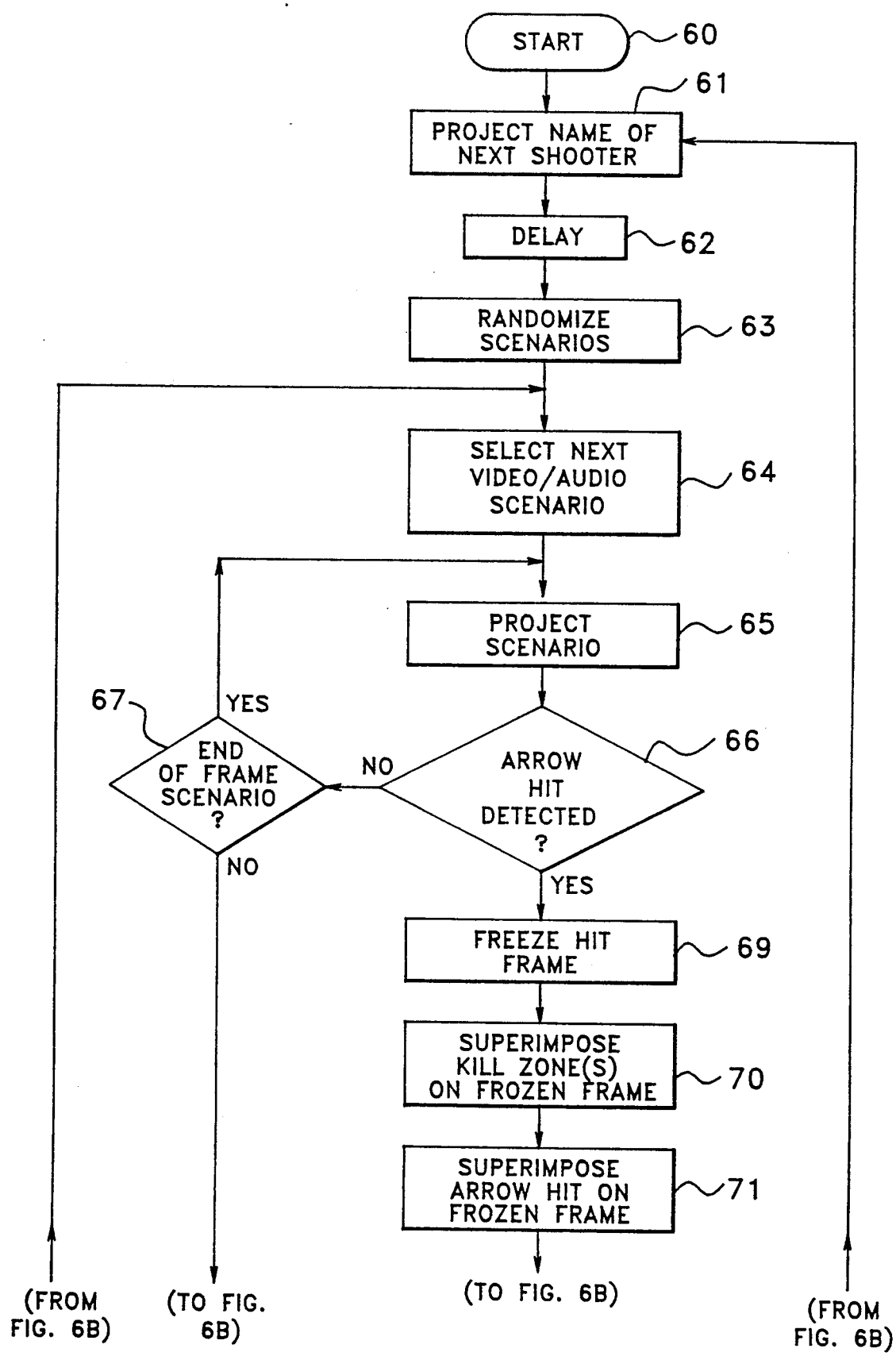
FIG. 6 is comprised of FIG. 6A and FIG. 6B to present a flowchart that shows a mode of operation of the invention.
Figure 6B:
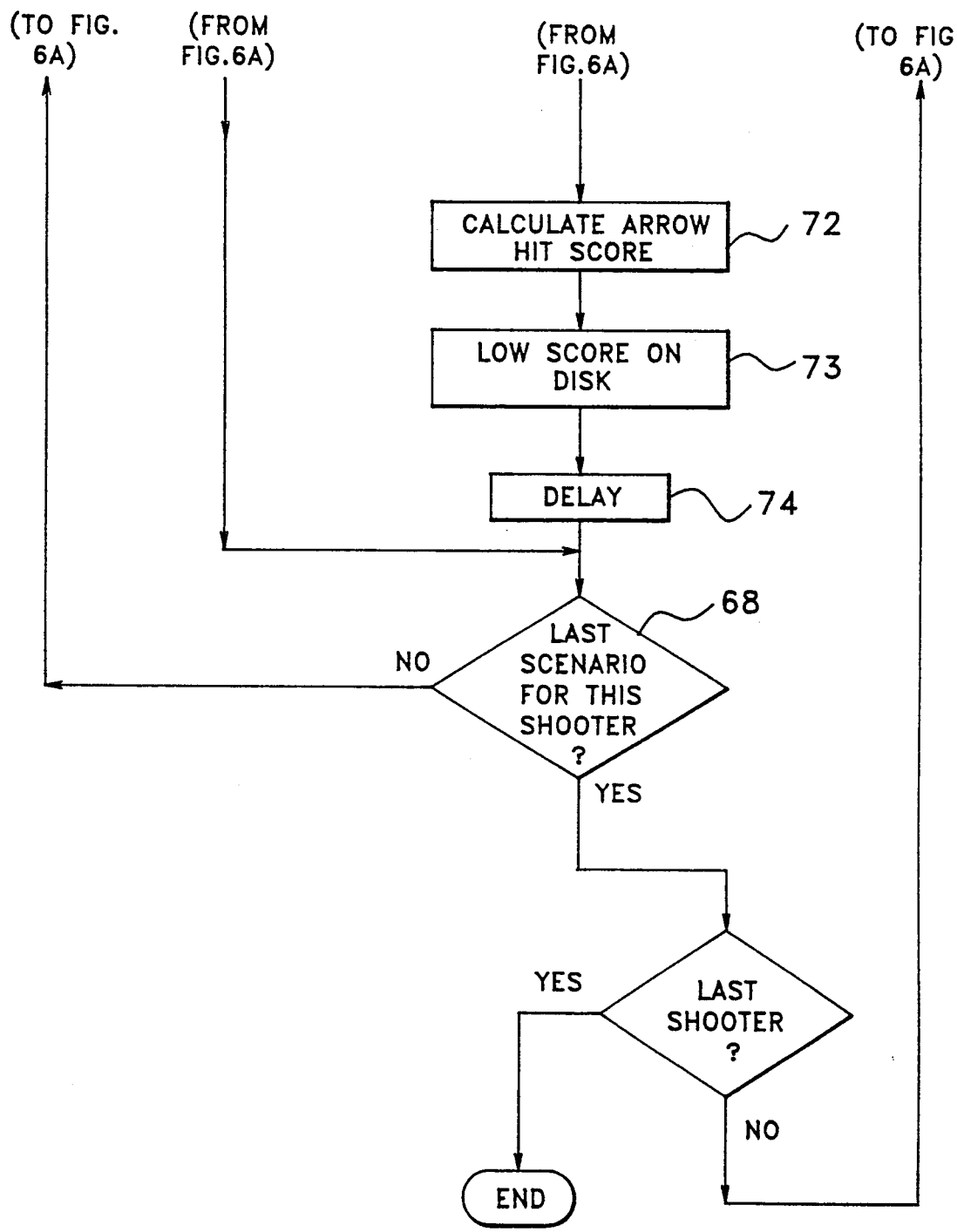

FIG. 6 is a flowchart that shows a mode of operation of the invention. Operation of the invention begins at start event 60. As a result of a start event, the name of the first (or next) shooter is projected on screen 14 by operation of projector 13. Of course, prior to this time, the names of the various shooters and possibly other relevant information were entered into memory that is associated with CPU 33 by way of manual operation of keyboard 35.

Initially, for a match event box 61 causes projection of the name of the first shooter onto screen 14, whereupon delay box 62 provides a period of time such as five seconds for this shooter to become ready in shooting area 31. After, or perhaps concurrent with, this delay interval, box 63 operates to randomize the selection of a given number of scenarios from disk player 37 for this shooter, whereupon box 64 operates to select the first of these preselected scenarios for projection on screen 14.

Box 65 indicates the beginning of projection of a selected scenario, from the first to the last frame thereof. During this projection, decision box 66 monitors for an arrow hit, as detected by IR camera 21. As long as no arrow hit is detected, and as long as the last frame of the current projected scenario is not detected by box 67, box 65 operates to continue projection of the current scenario.

When an end frame of the current projected scenario is detected by box 67 without detection of an arrow hit by box 66, and when box 68 detects that this shooter has more scenarios to view for shooting, then box 64 operates to select the next scenario for projection for this shooter.

When an arrow hit is detected by box 66, box 69 operates to freeze the hit frame on screen 14 for viewing. The frame that is available for viewing now has the animal kill zone(s), if any, superimposed thereon by operation of box 70, and the location of the arrow hit is also superimposed thereon by operation of box 71, as shown in FIG. 5. This arrow hit results in CPU calculation of the resulting score by box 72, whereupon box 73 operates to log the score for the current shooter in memory, such as on a magnetic recording disk by operation of CPU 33.

Box 74 provides a delay interval of about four seconds during which the hit frame is projected for view, along with the location of the arrow hit and the animal kill zones. At the end of delay 74, box 68 determines if the last scenario has been projected for this shooter. If not, then box 64 operates to begin the projection of the next scenario.

If box 68 determines that this shooter was presented with the last scenario for that shooter, then box 75 determines if the current shooter is the last shooter, If yes, the process ends. If no, box 61 operates to project the name of the next shooter on screen 14, whereupon the process repeats for the next shooter, as above described.

The system described hereinabove automatically freezes the frame each time the arrival of an arrow at the vertical imaging plane of the screen 14 is detected. However, it is possible to modify the system so that the user can select other image display disciplines. One selection could cause the frame sequences to continue to the end of the scenario no matter how many arrow impacts are detected but with the location and frame numbers of the hits stored in memory for later presentation.

Alternatively, the frames might continue until a preselected number of arrow impacts are detected. Thereafter, the system could sequence through so as to display each frame of that scenario wherein an arrow impact was sensed while depicting the result of each hit along with the score obtained.

The above detailed description has described preferred embodiments of the invention. However, since it is apparent that those skilled in the art will readily visualize yet other embodiments that are within the spirit and scope of the invention, it is intended that the above description not be taken as a limitation on the spirit and scope of the invention. That is, while the exemplary preferred embodiments of the present invention are described herein with particularity, those having normal skill in the art will recognize various changes, modifications, additions and applications other than those specifically mentioned herein without departing from the spirit of this invention.

What is claimed is:

1. A method providing archery practice simulating an animal hunt, comprising the steps of;
    providing a video disk containing a plurality of scenes of animals in a natural environment,
    providing a vertical screen whose size simulates an area normally viewed by an archer during an animal hunt, said screen comprising a plurality of pixel areas arranged in a plurality of horizontal rows and vertical columns,
    providing a video projector spaced from one side of said screen,
    coupling said projector to said video disk and using said projector to project at least one of said hunting scenes onto said one side of said screen,
    providing a continuous full screen field of light of a spectrum that is not visible to a human, said field of light being spaced from but in close proximity to said one side of said screen,
    providing an arrow that is capable of reflecting light of said spectrum as the arrow penetrates said field of light,
    providing a detector that is sensitive to light of said spectrum and is not sensitive to a projected hunting scene, said detector being positioned to receive light reflected from an arrow as said arrow penetrates said field of light, and to then generate a signal corresponding to a pixel area of said screen, certain of which pixels areas contain indicia of light reflection from an arrow,
    freezing said hunting scene on said screen upon said detector detecting light reflection from an arrow, and
    coordinating said frozen hunting scene to the signal from said detector and thereby projecting a hit zone image on said screen to indicate a point of arrow impact thereon.

2. The method of claim 1 including the steps of
    providing the arrow with a blunt end such that upon impact with the screen the arrow drops vertically out of the area of the screen, and
    disabling response of said detector to secondary reflections that may occur during said vertical drop of an arrow.

3. The method of claim 2 including the steps of
    providing said video disk with audio signals for each of said hunting scenes, said audio signals simulating the native environment of each hunting scene, and
    coupling said audio signals to speakers located adjacent to said archer and in synchronism with the projection of hunting scenes onto said one side of said screen.

4. The method of claim 3 including the steps of
    providing a plurality of kill zone images corresponding to the portion of said hunting scenes wherein a critical area of one or more animals therein are exposed to impact by an arrow,
    coordinating a kill zone image on said screen with said frozen hunting scene when a kill zone image is provided therefor upon said detector detecting light reflection from an arrow, and
    projecting a kill zone image on said screen to indicate the relationship between the kill zone image and the point of arrow impact.

5. The method of claim 4 wherein said hit zone image comprises a plurality of concentric zones and a point of arrow impact, and including the step of scoring by determining overlap of said zone images and said arrow impact point.

6. A method providing archery practice simulating a dynamic target scene as in an animal hunt, comprising the steps of;
    projecting target scenes in sequence on a screen for viewing as a dynamic target by an archer,
    detecting an arrow hit at a hit location on said screen upon the occurrence of an arrow launched by said archer at a given scene,
    freezing said given scene on said screen for viewing by said archer upon detection of said arrow hit at said hit location on said screen, and
    projecting said hit location on said screen for viewing by said archer along with said frozen scene, with said arrow hit location visually indicated to said archer on said given scene as an indication of the accuracy of said arrow hit relative to said given scene.

7. The method of claim 6 including the step of
    providing audio signals simulating the native environment of each hunting scene.

8. The method of claim 7 in conjunction with animal hunting scene presentations which includes the steps of
    providing a kill zone image in said hunting scenes wherein a critical kill zone area of an animal therein is exposed for viewing by said archer and for impact by an arrow, and
    coordinating a kill zone image on said screen with said given scene whereby the relationship between the kill zone image and said arrow hit location can be visually evaluated by said archer as said archer views said screen.

9. Apparatus for simulating a moving hunt scene for an arrow shot by an archer comprising
    a screen having a vertical imaging plane, means projecting a sequence of visual frames comprising said moving hunt scene onto said vertical imaging plane for presenting at least one hunt object visible to the archer, means responsive to arrival of an arrow shot by an archer at said vertical imaging plane for sensing the coordinate location of said arrow on said plane, means responsive to said sensing means for comparing said arrow coordinate position with said hunt object within one of said visual frames that was present on said vertical imaging plane when said arrow arrived thereat, means for determining the accuracy of the arrival of said arrow relative to said hunt object presented by said one visual frame, means responsive to said sensing means for freezing said one visual frame on said screen for viewing by the archer, and means projecting said arrow coordinate position on said screen for viewing by the archer along with said one visual frame.

10. Apparatus in accordance with claim 9 wherein said hunt object at least periodically appears to move and said screen includes means for stopping arrows by absorbing the impact thereof.

11. Apparatus in accordance with claim 10 wherein said screen includes a flexible sheet facing the archer for producing images of said visual frames and a pad parallel thereto and in backing relation to said sheet for absorbing the impact of an arrow shot by an archer.

12. Apparatus in accordance with claim 11 wherein said flexible sheet is formed by an open mesh first layer facing the archer and a solid second layer between said first layer and said pad.

13. Apparatus in accordance with claim 12 which includes spring means and wherein said first layer is of polyester material retained in position under tension by said spring means, said second layer is of felt fabric, and said paid is of carpeting material; said apparatus further including means mounting said second layer and said pad for pivotal movement around one edge thereof.

14. Apparatus in accordance with claim 9 wherein each arrow includes means for reflecting light of a non-visible spectrum, said sensing means including means directing light of said non-visible spectrum upon said reflecting means of said arrow when said arrow arrives at said screen and detector means responsive to said non-visible light reflected from said arrow reflecting means.

15. Apparatus in accordance with claim 14 wherein said light directing means includes an elongated light source for directing a thin wall of said non-visible light parallel to the face of said screen imaging plane and in close proximity to said screen face.

16. Apparatus in accordance with claim 15 wherein said elongated light source includes an elongated array of light generators and a lens for receiving the light from said generators for collimating said received light into said thin wall of non-visible light.

17. Apparatus in accordance with claim 16 wherein said detector means includes means monitoring the entire face of said imaging plane.

18. A method for providing archery practice by an archer, comprising the steps of;

providing a video disk containing a plurality of visual scenes, providing a reflection screen whose size simulates an area normally viewed by an archer, providing a video projector spaced from one side of said screen, coupling said projector to said video disk and using said projector to project at least one of said scenes onto said one side of said screen, providing a full screen sensing field in proximity to said one side of said screen, providing an arrow that is capable of being sensed as said arrow penetrates said sensing field, and providing a detector that is sensitive to an arrow penetrating said sensing field, said detector being operable to generate a signal corresponding to a zone of said screen corresponding to said arrow penetrating said sensing field.

19. The method of claim 18 including the steps of;

freezing said one scene on said screen upon said detector detecting penetration of said sensing field, coordinating said frozen scene to the signal from said detector, and projecting a hit zone image on said screen to indicate a zone of arrow impact thereon corresponding to said arrow penetrating said sensing field.

20. The method of claim 19 including the steps of;

providing said video disk with audio signals for said scenes, said audio signals simulating the environment of each such scene, and coupling said audio signals to speakers located adjacent to said archer in synchronism with the projection of scenes onto said one side of said screen.

21. The method of claim 20 including the steps of providing a hit zone visual image corresponding to a portion of said scenes wherein a hit zone of a scene is exposed to impact by an arrow, coordinating a hit zone image on said screen with said frozen scene when a hit zone image is provided therefor upon said detector detecting an arrow penetrating said sensing field, and projecting a hit zone image on said screen to indicate the relationship between the projected hit zone image and an arrow impact.

22. Apparatus for visually providing a moving hunt scene toward which an arrow shot by an archer is directed, comprising:

a screen having an imaging plane, means projecting a sequence of visual scenes onto said imaging plane, said sequence of visual scenes presenting at least one moving arrow target, means responsive to arrival of an arrow shot by an archer at said imaging plane for sensing the arrival location of said arrow on said plane, means responsive to said sensing means for comparing said arrow arrival location with the position of said arrow target within one visual scene that was present on said imaging plane at the time of arrival of said arrow on said plane, means for determining the accuracy of said arrow arrival location relative to said arrow target position that was provided by said one visual scene, means responsive to said sensing means for freezing said one visual scene onto said imaging plane for viewing by an archer, and means projecting said arrow arrival location on said imaging plane along with said one visual frame.

23. Apparatus in accordance with claim 22 wherein said arrow target at least periodically appears to move.

24. Apparatus in accordance with claim 22 wherein said sensing means includes means directing electromagnetic radiation adjacent to said imaging plane for penetration by an arrow as the arrow arrives at said imaging plane, and detector means responsive to said electromagnetic radiation reflected from the arrow.

25. Apparatus in accordance with claim 24 wherein said detector means monitors substantially all of said imaging plane for arrival of an arrow.

* * * * *